US012770501B2

(12) United States Patent
Aoki et al.

(10) Patent No.: US 12,770,501 B2
(45) Date of Patent: Oct. 20, 2026

(54) TRAFFIC CONTROL DEVICE

(71) Applicant: TOYOTA JIDOSHA KABUSHIKI KAISHA, Toyota (JP)

(72) Inventors: Takahiro Aoki, Saitama (JP); Ibuki Shimada, Miyoshi (JP); Hirohito Ide, Nagoya (JP); Seiji Suyama, Nagakute (JP); Kiyotaka Moriizumi, Nisshin (JP); Kazuyuki Inoue, Nagoya (JP); Tomokazu Maya, Nagoya (JP); Naoya Oka, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/966,992

(22) Filed: Dec. 3, 2024

(65) Prior Publication Data

US 2025/0209906 A1 Jun. 26, 2025

(30) Foreign Application Priority Data

Dec. 25, 2023 (JP) ................................ 2023-218627

(51) Int. Cl.
*G08G 1/01* (2006.01)

(52) U.S. Cl.
CPC ............ *G08G 1/01* (2013.01); *G08G 1/0145* (2013.01)

(58) Field of Classification Search
CPC .............................. G08G 1/01; G08G 1/0145
USPC ........................................................ 340/905
See application file for complete search history.

(56) References Cited

U.S. PATENT DOCUMENTS

| | | | | |
|---|---|---|---|---|
| 2017/0213458 | A1* | 7/2017 | Gordon | E01F 13/04 |
| 2017/0287234 | A1* | 10/2017 | Hashimoto | G07C 5/008 |
| 2019/0078902 | A1 | 3/2019 | Zhong et al. | |
| 2019/0189012 | A1* | 6/2019 | Balogh | G08G 1/163 |
| 2019/0304027 | A1* | 10/2019 | Hu | G06Q 50/182 |
| 2021/0356965 | A1* | 11/2021 | Forster | G01C 21/3453 |
| 2022/0171400 | A1* | 6/2022 | Chen | G08G 1/0145 |
| 2025/0108841 | A1 | 4/2025 | Seki et al. | |

FOREIGN PATENT DOCUMENTS

| | | | |
|---|---|---|---|
| JP | 2002-074582 | A | 3/2002 |
| JP | 2019-053432 | A | 4/2019 |
| JP | 2021-033880 | A | 3/2021 |
| WO | 2023/162063 | A1 | 8/2023 |

* cited by examiner

*Primary Examiner* — Kam Wan Ma
(74) *Attorney, Agent, or Firm* — SoraIP, Inc.

(57) ABSTRACT

The traffic control device includes a control unit that identifies one vehicle at a time, acquires vehicle information indicating a safety-related function mounted on the identified vehicle for each vehicle, selects a vehicle that imposes restrictions on entry into a specific road from among the identified vehicles on the basis of the acquired vehicle information, and notifies the user of the selected vehicle of the restriction information as the restriction information.

9 Claims, 2 Drawing Sheets

TRAFFIC CONTROL DEVICE

CROSS-REFERENCE TO RELATED APPLICATION

This application claims priority to Japanese Patent Application No. 2023-218627 filed on Dec. 25, 2023, incorporated herein by reference in its entirety.

BACKGROUND

1. Technical Field

The present disclosure relates to a traffic control device.

2. Description of Related Art

Japanese Unexamined Patent Application Publication No. 2019-053432 (JP 2019-053432 A) discloses a congestion avoidance assist system. The congestion avoidance assist system receives a request for avoidance of congestion from a business operator terminal. The congestion avoidance assist system determines an incentive based on a congestion avoidance target road in the request and a congestion status of the road. The congestion avoidance assist system distributes incentive information to each mobile terminal.

SUMMARY

Even if the number of automobiles that enter the congestion avoidance target road can be reduced, congestion may occur due to an accident.

An object of the present disclosure is to reduce an accident and suppress congestion.

A traffic control device according to the present disclosure includes a control unit configured to:

- identify individual vehicles;
- acquire, for the individual vehicles, pieces of vehicle information indicating safety-related functions on the identified vehicles;
- select, based on the acquired pieces of vehicle information, a vehicle on which a restriction is to be imposed about entry into a specific road from among the identified vehicles; and
- notify a user of the selected vehicle about information on the restriction as restriction information.

According to the present disclosure, an accident is reduced and congestion is suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described with reference to the drawings.

In each drawing, the same or corresponding portions are denoted by the same reference signs. In the description of the present embodiment, description of the same or corresponding components will be appropriately omitted or simplified.

Figure 1:
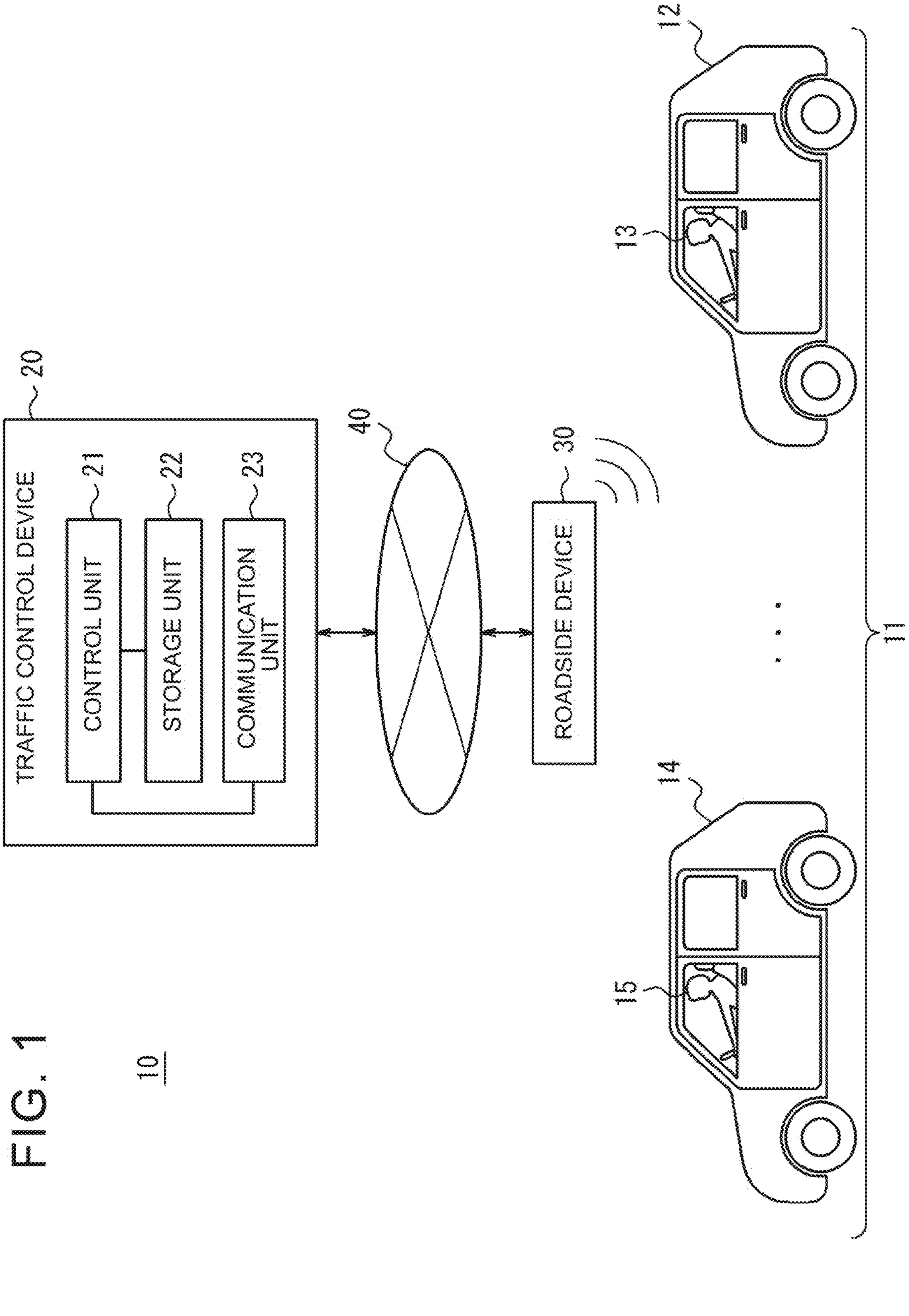
FIG. 1 is a block diagram illustrating a configuration of a traffic control system according to an embodiment of the present disclosure.

A configuration of the traffic control system 10 according to the present embodiment will be described with reference to FIG. 1.

The traffic control system 10 includes a traffic control device 20 and a roadside device 30. The traffic control device 20 can communicate with the roadside device 30 via the network 40.

The traffic control device 20 is a computer such as a server belonging to a cloud computing system or other computing system installed in a facility such as a data center. The traffic control device 20 may be operated by an administrative agency or may be operated by a private business operator.

The roadside device 30 is installed at or around the entrance of a particular road Rd, or at or around other roads that connect to the road Rd. The road Rd is, for example, a road that is prone to traffic congestion, such as an expressway on which a sag portion exists.

The network 40 includes the Internet, at least one WAN, at least one MAN, or any combination thereof. The term "WAN" is an abbreviation for "wide area network". The term "MAN" is an abbreviation for "metropolitan area network". The network 40 may include at least one wireless network, at least one optical network, or any combination thereof. The wireless network is, for example, an ad hoc network, a cellular network, a wireless LAN, a satellite communication network, or a terrestrial microwave network. The term "LAN" is an abbreviation for "local area network".

The outline of the present embodiment will be described with reference to FIG. 1.

The traffic control device 20 identifies the vehicles 11 one by one via the roadside device 30. The traffic control device 20 acquires, for each vehicle, vehicle information indicating a function related to safety, which is mounted on the identified vehicle 11. The traffic control device 20 selects, from among the identified vehicles 11, the vehicles 12 that impose restrictions on the entry into the road Rd based on the acquired vehicle data. The traffic control device 20 notifies the user 13 of the selected vehicle 12 of the restriction information as the restriction information via the roadside device 30.

According to the present embodiment, it is possible to determine, for each vehicle, whether or not to impose restrictions on entry into the road Rd depending on what safety-related function is mounted on the respective vehicles 11. By restricting access to the road Rd in accordance with the decisions, the number of accident-prone vehicles entering the road Rd can be reduced. As a result, the number of accidents is reduced and traffic congestion is less likely to occur.

Each vehicle 11 may be any type of vehicle, such as, for example, a petrol car, a die car, a vehicle, HEV, PHEV, BEV, or a FCEV. The term "HEV" is an abbreviation for "hybrid electric vehicle". The term "PHEV" is an abbreviation for "plug-in hybrid electric vehicle". The term "BEV" is an abbreviation for "battery electric vehicle". The term "FCEV" is an abbreviation for "fuel cell electric vehicle". Each vehicle 11 is driven by a user in the present embodiment, but the driving may be automated at an arbitrary level. The level of autonomous driving is, for example, one of levels 1 to 5 in the SAE leveling, for example. The term "SAE" is an abbreviation for the "Society of Automotive Engineers". The vehicles 11 may be MaaS dedicated vehicles. The term "MaaS" is an abbreviation for "mobility as a service".

Instead of identifying one vehicle 11 at a time via the roadside device 30, the traffic control device 20 may identify one vehicle 11 at a time via another device such as a road camera. Instead of notifying the user 13 of the selected vehicle 12 of the restriction information via the roadside device 30, the traffic control device 20 may directly communicate with the vehicle 12 via the network 40 to notify the user 13 of the restriction information. Alternatively, the traffic control device 20 may communicate with a mobile device, such as a mobile phone, a smartphone, or a tablet, of the user 13 via the network 40 to notify the user 13 of the restriction information.

In the present embodiment, the traffic control device 20 selects, from among the identified vehicles 11, a vehicle 11 that is not indicated to be equipped with a function of automatically avoiding a collision based on the vehicle information, as the vehicle 12 that imposes the restriction. For example, the vehicle 11 on which AEB or "pre-crash safety" is mounted may not be selected for the vehicle 12 that imposes the limitation. "AEB" is an abbreviation for autonomous emergency braking.

The vehicle information may select the vehicle 11 to which the restriction is imposed, the vehicle 12 not indicating that the vehicle is equipped with a function of automatically suppressing the lane departure. For example, the vehicle 11 on which LDW or the "lane departure alert", "lane keeping assist", or "lane arrangement assist" is mounted may not be selected for the vehicle 12 that imposes the limitation. "LDW" is an abbreviation for lane departure warning.

The vehicle information may select the vehicle 11 to which the restriction is imposed, the vehicle 12 not indicating that the function of automatically adjusting the inter-vehicle distance is mounted. For example, the vehicle 11 on which ACC is mounted may not be selected for the vehicle 12 that imposes the limitation. "ACC" is an abbreviation for adaptive cruise control.

In the present embodiment, the traffic control device 20 notifies the user 13 of the selected vehicle 12 of the penalty given when the vehicle enters the road Rd as the limit information. Penalties correspond to psychologically limiting access to the road Rd. Penalties include, for example, collection or increase of tolls, increase of premiums, or increase of taxes.

Instead of psychologically restricting access to the road Rd, access to the road Rd may be physically restricted. For example, the traffic control device 20 may close a gate installed at the entrance of the road Rd so that the selected vehicle 12 passes through a road different from the road Rd to prevent the vehicle from entering the road Rd.

The traffic control device 20 may notify the user 15 of the vehicle 14 that is not selected for the vehicle 12 that imposes the limitation among the identified vehicles 11 of the incentive given when entering the road Rd. Incentives include, for example, exemption or reduction of toll, reduction of insurance premiums, reduction of taxes, grant of points, or changing a driver's license in Japan to a gold license.

A configuration of the traffic control device 20 according to the present embodiment will be described with reference to FIG. 1.

The traffic control device 20 includes a control unit 21, a storage unit 22, and a communication unit 23.

The control unit 21 includes at least one processor, at least one programmable circuit, at least one dedicated circuit, or any combination thereof. The processor is a general-purpose processor such as a CPU or a GPU, or a dedicated processor specialized for a specific process. The term "CPU" is an abbreviation for "central processing unit". The term "GPU" is an abbreviation for "graphics processing unit". The programmable circuit is, for example, an FPGA. The term "FPGA" is an abbreviation for "field-programmable gate array". The dedicated circuit is, for example, an ASIC. The term "ASIC" is an abbreviation for "application specific integrated circuit". The control unit 21 executes processing related to the operation of the traffic control device 20 while controlling each unit of the traffic control device 20.

The storage unit 22 includes at least one semiconductor memory, at least one magnetic memory, at least one optical memory, or any combination thereof. The semiconductor memory is, for example, a RAM, a ROM, or a flash memory. The term "RAM" is an abbreviation for "random access memory". The term "ROM" is an abbreviation for "read-only memory". The RAM is, for example, an SRAM or a DRAM. The term "SRAM" is an abbreviation for "static random access memory". The term "DRAM" is an abbreviation for "dynamic random access memory". The ROM is, for example, an EEPROM. The term "EEPROM" is an abbreviation for "electrically erasable programmable read only memory". The flash memory is, for example, an SSD. The term "SSD" is an abbreviation for solid-state drive. The magnetic memory is, for example, an HDD. The term "HDD" is an abbreviation for hard disk drive. The storage unit 22 functions as, for example, a main storage device, an auxiliary storage device, or a cache memory. The storage unit 22 stores information used for the operation of the traffic control device 20 and information obtained by the operation of the traffic control device 20.

The communication unit 23 includes at least one communication module. The communication module is, for example, an interface corresponding to a wired LAN communication standard such as Ethernet (registered trademark), or an interface corresponding to a wireless LAN communication standard such as IEEE802.11. The term "IEEE" is an abbreviation for Institute of Electrical and Electronics Engineers. The communication unit 23 communicates with the roadside device 30. The communication unit 23 may communicate with other devices such as a road camera. The communication unit 23 may communicate with each vehicle 11. The communication unit 23 may communicate with a mobile device of the user 13 of the vehicle 12. The communication unit 23 receives information used for the operation of the traffic control device 20 and transmits information obtained by the operation of the traffic control device 20.

The function of the traffic control device 20 is realized by executing the program according to the present embodiment by a processor serving as the control unit 21. That is, the functions of the traffic control device 20 are realized by software. The program causes the computer to function as the traffic control device 20 by causing the computer to execute the operation of the traffic control device 20. That is, the computer functions as the traffic control device 20 by executing the operation of the traffic control device 20 in accordance with the program.

The program can be stored in a non-transitory computer-readable medium. The non-transitory computer-readable medium is, for example, a flash memory, a magnetic recording device, an optical disc, an opto-magnetic recording medium, or a ROM. The distribution of the program is carried out, for example, by selling, transferring, or renting a portable medium such as an SD card, a DVD, or a CD-ROM in which the program is stored. The term "SD" is an abbreviation for "secure digital". The term "DVD" is an abbreviation for "digital versatile disc". The term "CD-ROM" is an abbreviation for "compact disc read only memory". The program may be stored in the storage of the server and transferred from the server to other computers to distribute the program. The program may be provided as a program product.

The computer temporarily stores the program stored in the portable medium or the program transferred from the server in the main storage device, for example. The computer then causes the processor to read the program stored in the main storage device, and causes the processor to execute processes in accordance with the read program. The computer may read the program directly from the portable medium and execute processes in accordance with the program. The computer may execute the processes in accordance with the received program each time the program is transferred from the server to the computer. The processes may be executed by a so-called ASP service that realizes the function only by execution instruction and result acquisition without transferring the program from the server to the computer. The term "ASP" is an abbreviation for "application service provider". The program includes information that is used for processing by electronic computers and equivalent to a program. For example, data that is not a direct command to a computer but has the property of defining the processing of the computer corresponds to the "data equivalent to a program".

Some or all of the functions of the traffic control device 20 may be realized by a programmable circuit or a dedicated circuit as the control unit 21. That is, some or all of the functions of the traffic control device 20 may be realized by hardware.

The operation of the traffic control device 20 according to the present embodiment will be described with reference to FIG. 2. The operation described below corresponds to the traffic control method according to the present embodiment. That is, the traffic control methods according to the present embodiment include S4 steps from S1 shown in FIG. 2. The steps from S1 to S4 are executed individually for each of the vehicles 11.

In S1, the control unit 21 identifies the vehicles 11. Specifically, the control unit 21 communicates with the roadside device 30 via the communication unit 23, and the roadside device 30 acquires an identifier such as a registration number of the vehicle 11 received from the vehicle 11 from the roadside device 30, thereby identifying the vehicle 11. Alternatively, the control unit 21 may identify the vehicle 11 by communicating with the road camera via the communication unit 23 and acquiring an image of the license plate of the vehicle 11 captured by the road camera from the road camera.

In S2, the control unit 21 acquires vehicle data indicating a safety-related function mounted on the vehicle 11 identified by S1. Specifically, the control unit 21 searches a database constructed in the storage unit 22 and storing what safety-related functions are mounted in the database for each vehicle or each vehicle type, and acquires vehicle information from the database. Alternatively, the control unit 21 may retrieve, via the communication unit 23, an external database that stores, for each vehicle or for each vehicle type, which safety-related function is mounted, and acquire the vehicle information from the external database. Alternatively, the control unit 21 may directly communicate with the vehicle 11 via the communication unit 23 to acquire vehicle information from the vehicle 11.

In S3, the control unit 21 determines, based on the vehicle data acquired by S2, whether or not to impose a limit on the vehicle 11 identified by S1 with respect to entering the road Rd. Specifically, if the vehicle information does not indicate that a function of automatically avoiding a collision is mounted, the control unit 21 decides to impose a restriction. That is, the control unit 21 selects the vehicle 11 as the vehicle 12 to which the restriction is imposed. On the other hand, when the vehicle information indicates that a function of automatically avoiding a collision is mounted, the control unit 21 determines that no restriction is imposed. That is, the control unit 21 does not select the vehicle 11 as the vehicle 12 to which the restriction is imposed.

If it is determined to impose restrictions on S3, i.e. if vehicles 12 which impose restrictions are selected, S4 steps are performed. On the other hand, when it is determined that the limitation is not imposed by S3, the process illustrated in FIG. 2 ends.

In S4, the control unit 21 notifies the user 13 of the vehicle 12 selected by S3 of the restriction information as the restriction information. Specifically, the control unit 21 communicates with the roadside device 30 via the communication unit 23, and notifies the user 13 of the penalty given when entering the roadside Rd from the roadside device 30 as the limit information. Alternatively, the control unit 21 may directly communicate with the vehicle 12 via the communication unit 23 to notify the user 13 of the penalty as restriction information. Alternatively, the control unit 21 may communicate with the mobile device of the user 13 via the communication unit 23 to notify the user 13 of the penalty as restriction information.

If it is determined that no restriction is imposed on S3, the control unit 21 may notify the user 15 of the vehicle 14 that has not selected the vehicle 12 that imposes the restriction of the incentive given when entering the road Rd. Specifically, the control unit 21 may communicate with the roadside device 30 via the communication unit 23 to notify the user 15 of the incentive from the roadside device 30. Alternatively, the control unit 21 may directly communicate with the vehicle 14 via the communication unit 23 to notify the user 15 of the incentive. Alternatively, the control unit 21 may communicate with a mobile device such as a mobile phone, a smartphone, or a tablet of the user 15 via the communication unit 23 to notify the user 15 of the incentive.

A modification of the operation shown in FIG. 2 will be described with reference to FIG. 3. S1 and S4 steps are the same as those shown in FIG. 2, and therefore will not be described.

Figure 2:
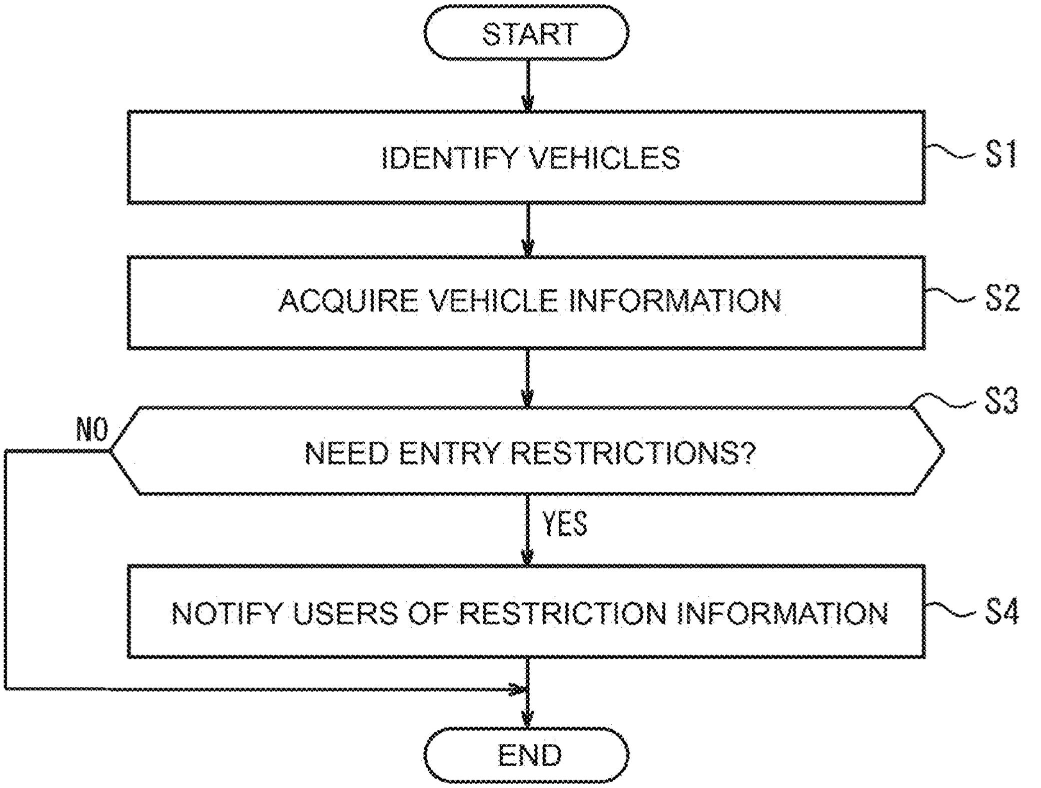
FIG. 2 is a flow chart illustrating the operation of the traffic control device according to the disclosed embodiment.
Figure 3:
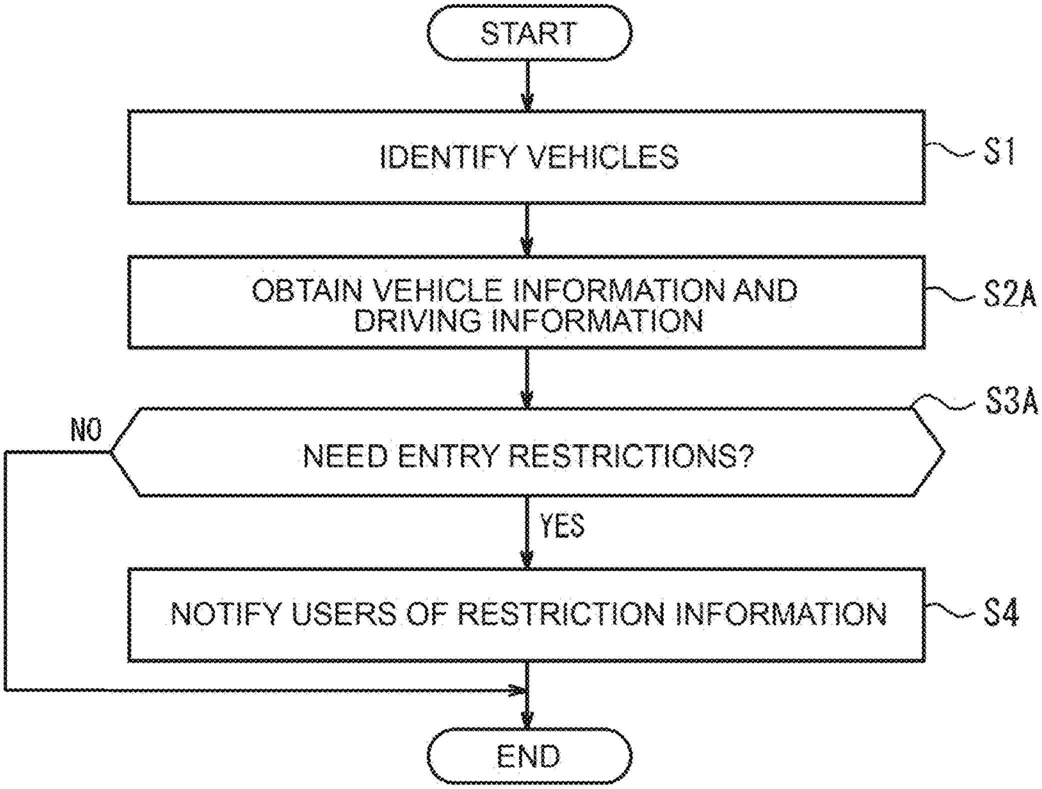
FIG. 3 is a flowchart illustrating a modification of the operation of the traffic control device according to the embodiment of the present disclosure.

After S1, in S2A, the control unit 21 acquires, in the same manner as the steps of S2 illustrated in FIG. 2, vehicle data indicating safety-related functions mounted on the vehicle 11 identified by S1. The control unit 21 further acquires driving data indicating the driving records of the vehicles 11 identified by S1. Specifically, the control unit 21 searches a database constructed in the storage unit 22 and storing the driving record for each vehicle, and acquires the driving information from the database. Alternatively, the control unit 21 may retrieve an external database in which the driving record is stored for each vehicle via the communication unit 23, and acquire the driving information from the external database. Alternatively, the control unit 21 may directly communicate with the vehicle 11 via the communication unit 23 to acquire driving information from the vehicle 11.

After S2A, in S3A, the control unit 21 determines, based on the vehicle information and the driving information acquired by S2A, whether or not to impose a limit on the vehicle 11 identified by S1 with respect to entering the roadway Rd. Specifically, the control unit 21 decides to impose restrictions when the vehicle information does not indicate that a function of automatically avoiding a collision is mounted, or when the driving information indicates that the driving manner of the user is poor. For example, when the driving data indicates that AEB or "pre-crash safety" is frequently activated, it can be estimated that the driving manners of the user are poor. On the other hand, the control unit 21 determines that no restriction is imposed when the vehicle information indicates that a function of automatically avoiding a collision is mounted and the driving information indicates that the driving manner of the user is poor.

If it is determined to impose restrictions on S3A, i.e. if vehicles 12 which impose restrictions are selected, S4 steps are performed. On the other hand, when it is determined that the limitation is not imposed by S3A, the process illustrated in FIG. 3 ends.

According to this modification, it is possible to determine, for each vehicle, whether or not to impose a limitation on entry into the roadway Rd depending on whether or not the driving manners of the users of the respective vehicles 11 are poor. By restricting the entry into the road Rd according to the determination, the number of vehicles that enter the road Rd and are driven by a driver with poor manners can be reduced. As a result, the number of accidents is reduced and traffic congestion is less likely to occur.

If it is determined that S3A does not impose a restriction, but the driving data indicates that the user has not experienced driving, the control unit 21 may notify the user 15 of the vehicle 14 that has not selected the vehicle 12 that imposes the restriction of the advice regarding the safe driving. The advice on the safe driving is the way of driving in the sag part of the expressway. Specifically, the control unit 21 may communicate with the roadside device 30 via the communication unit 23 to notify the user 15 of the advice from the roadside device 30. Alternatively, the control unit 21 may directly communicate with the vehicle 14 via the communication unit 23 to notify the user 15 of the advice. Alternatively, the control unit 21 may communicate with the mobile device of the user 15 via the communication unit 23 to notify the user 15 of the advice.

The present disclosure is not limited to the embodiment described above. For example, two or more blocks shown in the block diagram may be integrated, or a single block may be divided. Instead of executing two or more steps shown in the flowchart in chronological order according to the description, the steps may be executed in parallel or in a different order, depending on the processing capacities of the devices that execute the steps, or as necessary. Other changes may be made without departing from the scope of the present disclosure.

What is claimed is:

1. A traffic control device comprising a processor configured to:
- acquire images of license plates of individual vehicles captured by a camera;
- identify the individual vehicles by the images of the license plates;
- acquire, for the individual vehicles, pieces of vehicle information indicating safety-related functions on the identified vehicles from a database;
- select, based on the acquired pieces of vehicle information, a vehicle on which a restriction is to be imposed about entry into a specific road from among the identified vehicles; and
- send restriction information, including a type of the restriction to be imposed, to a roadside device or a mobile terminal of a user of the selected vehicle, to notify the user of the type of the restriction information.

2. The traffic control device according to claim 1, wherein the processor is configured to select, from among the identified vehicles, a vehicle with the vehicle information that does not indicate that the vehicle has a function of automatically avoiding collision as the vehicle on which the restriction is to be imposed.

3. The traffic control device according to claim 1, wherein the processor is configured to:
- further acquire, for the individual vehicles, pieces of driving information indicating driving records of the identified vehicles; and
- select the vehicle on which the restriction is to be imposed based on the acquired pieces of vehicle information and the acquired pieces of driving information.

4. The traffic control device according to claim 1, wherein the processor is configured to notify the user of the selected vehicle about a penalty to be given when the vehicle enters the specific road as the restriction information.

5. The traffic control device according to claim 1, wherein the processor is configured to notify a user of a vehicle that is not selected as the vehicle on which the restriction is to be imposed among the identified vehicles about an incentive to be given when the vehicle enters the specific road.

6. A traffic control system comprising the traffic control device according to claim 1 and the roadside device installed at or proximity to an entrance of the specific road.

7. The traffic control device according to claim 4, wherein the penalty includes collection or increase of tolls, increase of premiums, or increase of taxes.

8. The traffic control device according to claim 3, wherein the acquired pieces of driving information include data on driving manner of the user.

9. The traffic control device according to claim 8, wherein the data on the driving manner includes a frequency of an autonomous emergency braking of the vehicle being activated.

* * * * *